SOUND IF GAIN REGULATION
Filed June 22, 1956
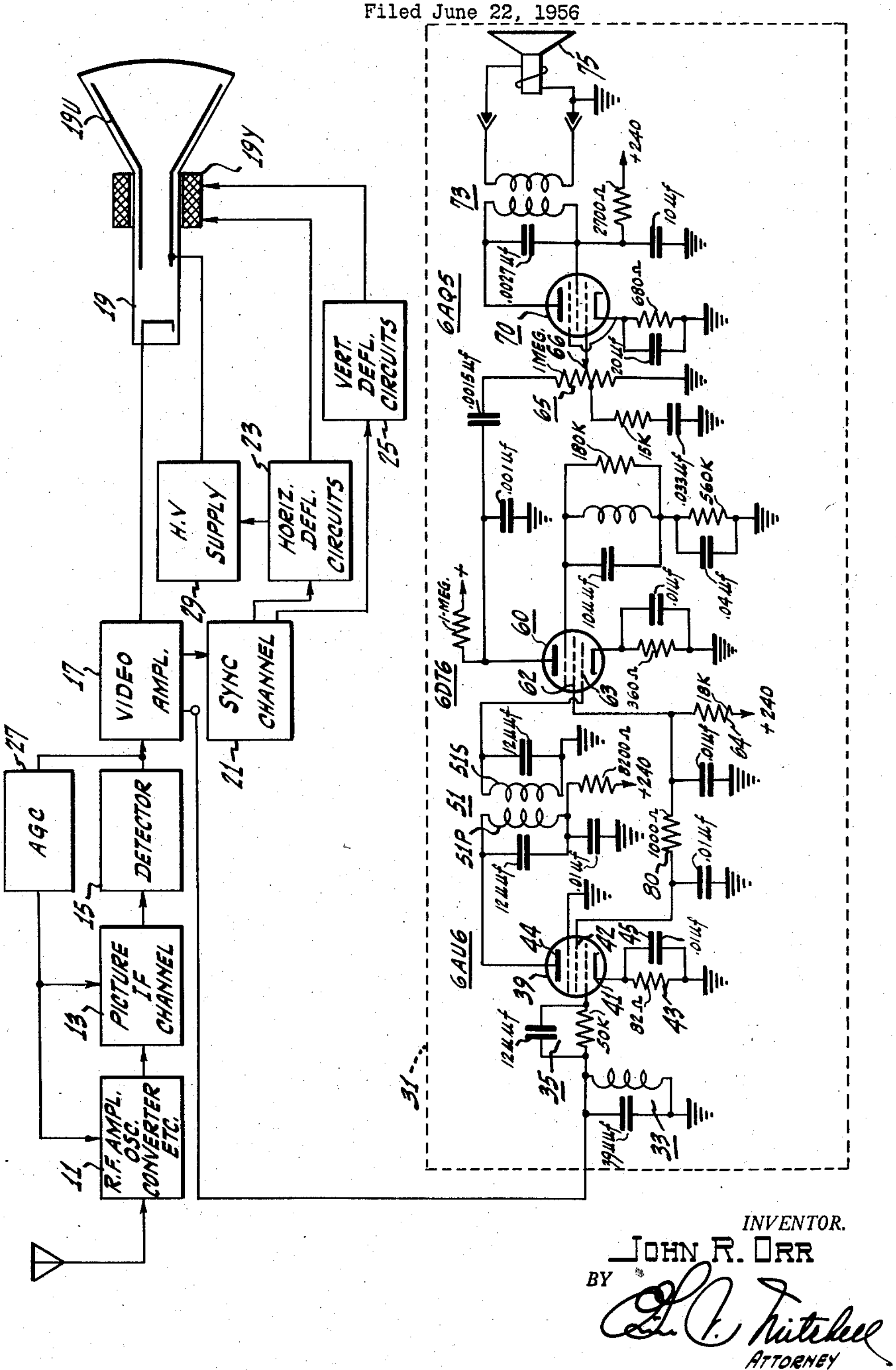
INVENTOR.
JOHN R. ORR
BY
[signature]
ATTORNEY 2,874,277

SOUND I. F. GAIN REGULATION

John Richard Orr, Merchantville, N. J., assignor to Radio Corporation of America, a corporation of Delaware Application June 22, 1956, Serial No. 593,091

6 Claims. (Cl. 250—20)

The present invention relates generally to FM signal receiving systems, and more particularly to circuits for regulating gain in I. F. channels of such receiving systems, such as the sound I. F. channel of a television receiver.

The present invention is particularly adapted to use in association with an FM detector of the locked-oscillator quadrature-grid type as disclosed in the article by Avins and Brady entitled "A Locked-Oscillator Quadrature-Grid FM Sound Detector," appearing in the December 1955 issue of the RCA Review, pages 648 through 655. The detector disclosed in the aforesaid article uses a pentode type electron tube having a sharp-cutoff suppressor-grid characteristic. The sound I. F. (i. e. 4.5 mc., in an intercarrier television receiver) input signal is applied to the pentode control grid and space-charge coupling develops a sound I. F. voltage across a tuned circuit connected to the suppressor grid. When the input signal is at its center frequency, the suppressor grid voltage is in quadrature with the control grid signal. As the modulation swings the frequency of the input signal above and below this center value, the phase of the suppressor grid voltage swings back and forth about the quadrature relationship. The combined effect on the plate current of the control and suppressor grid voltages results in FM detection.

At low signal levels, the above-described circuit functions as a locked-oscillator detector because of internal feedback between the suppressor and control grid circuits. In addition to a predetermined voltage gain from the control grid to the suppressor grid, accompanied by a phase shift, there is coupling in the reverse direction from the suppressor to the control grid through the suppressor-control grid inter-electrode capacitance. In a representative embodiment of the disclosed circuits, sufficient energy is returned to the input circuit to maintain operation at a level of about one volt at the control grid and to develop the required suppressor bias. This action provides a 4.5 megacycle level substantially independent of reduction in the injected signal from the driver. A signal with an amplitude down to approximately one-third volt is sufficient to lock the oscillator and pull it to full deviation. When the input signal falls below the minimum locking level and synchronization is lost, a beat occurs between the oscillator output and the incoming signal. The level, for a given FM deviation, at which lock-in is lost and the beat occurs, i. e. where the signal "breaks-out," is referred to as a measure of the "break-out sensitivity" of the detector.

As for many other forms of FM detectors, the I. F. amplifier supplying signals to the detector is called upon to perform an amplitude limiting function so that undesired amplitude modulation of the FM signal will be suppressed before arrival at the detector stage to avoid development of spurious audio signals via AM detection. In the usual receiver, the voltage regulation at the screen electrode for the sound I. F. amplifier is sufficiently poor that the screen voltage will rise and fall with the input signal level. That is, on a strong signal, the screen voltage is always higher than on a weak signal. Gain of the sound I. F. amplifier thus usually rises for a strong signal and drops for a weak signal.

The present invention recognizes, however, that for best sensitivity and limiting, the screen voltage should vary in the opposite manner with respect to signal level variations; i. e., as the incoming signal gets weaker, the screen voltage should increase so as to increase the amplifier gain, whereby to realize an improvement in the effective "break-out sensitivity" of the aforesaid FM detector apparatus. Correspondingly, as the signal level goes higher, the screen voltage should drop; for optimum limiting performance, it is desirable to avoid increased gain at strong input signal levels.

In accordance with an embodiment of present invention, the screen grid of the sound I. F. amplifier is not separately connected to the receiver's B+ supply by its own voltage dropping resistor connection, but rather is connected to the screen grid of the locked-oscillator quadrature-grid detector. It has been observed that the screen voltage of such a detector varies inversely with input signal level. On weak signals, when the detector is oscillating, the current drawn by the screen grid is small relative to the current drawn thereby on a strong signal (i. e., when it is not oscillating). The present invention thus conveniently provides a form of sound I. F. gain control which improves the break-out sensitivity and the limiting performance of the amplifier-detector combination. An object of the present invention is thus to provide a novel and improved FM detection system.

An additional object of the present invention is to provide an FM detector circuit having improved break-out sensitivity.

A further object of the present invention is to provide a novel and improved system for sound I. F. gain control in television receivers.

Other objects and advantages of the present invention will be apparent to those skilled in the art after a reading of the following detailed description and an inspection of the accompanying drawing, the single figure of which is a circuit diagram, in block and schematic form, of a television receiver, embodying the present invention.

Referring to the drawing, the television receiver includes the usual head end section 11, which may, for example, include the conventional combination of R. F. amplifier, local oscillator and converter. The intermediate-frequency converter output is applied to a conventional picture I. F. amplifier channel 13, which supplies amplified intermediate frequency signals to the second detector 15. The video signal output of the second detector 15 is amplified in a video amplifier 17, and applied to the cathode of the image reproducing kinescope 19. The receiver also includes the usual sync signal channel 21 for effecting the control of the horizontal and vertical deflection circuits 23 and 25, respectively, which energize the appropriate windings of the kinescope yoke 19Y. The receiver may also include the usual circuit 27 for effecting automatic gain control of R. F. and I. F. amplifier stages. High voltage for the kinescope final anode 19U is provided by high voltage supply means 29, of the usual kickback type operatively associated with the horizontal deflection circuit 23.

The illustrated receiver may be observed to be of the so-called "intercarrier sound" type, the sound channel 31 being driven by a 4.5 megacycle I. F. signal, which appears in the output of the second detector 15 as a difference beat between the picture and sound carrier. In the illustrated receiver, it may be assumed that a suitable 4.5 megacycle sound takeoff is provided in output circuit of video amplifier 17. The frequency modulated sound I. F. carrier appearing at this takeoff is applied across a parallel resonant circuit 33 tuned to the intercarrier beat. The resonant circuit 33 is in series with the parallel RC network 35 in the grid return of the sound I. F. amplifying tube 39, indicated as a pentode. The cathode 41 of the tube 39 is connected to ground for the system through a cathode resistor 43 shunted by a by-pass capacitor 45. The plate 44 of the pentode tube 39 is connected to a suitable source of positive operating (B+) voltage through the tuned primary winding 51P of the sound I. F. transformer 51. The tuned transformer secondary 51S is connected between the control grid 63 of the sound detector pentode tube 60, and a point of reference potential (e. g., ground for the system).

The sound detector 60 is connected to operate as a locked-oscillator quadrature-grid detector; the circuit arrangements are essentially those shown in the aforementioned article by Avins and Brady. For a more detailed explanation of the operation of the detector circuit, than hereinbefore given, reference may be made to the description in said article. A potentiometer 65 in the plate circuit of detector 60 serves as the sound volume control. The adjustable contact 66 of potentiometer 65 is directly connected to the input grid of the pentode 70 which serves as an audio output stage delivering audio signals through the audio output transformer 73 to the loud speaker 75 of the receiver.

To appreciate the application of the principles of the present invention to a sound channel as above described, attention may now be directed to the circuits provided for supplying operating voltages to the screen grids of the sound I. F. amplifier 39 and the sound detector 60. It will be observed that the screen grid 62 of the sound detector 60 is connected to the receiver's source of B+ voltage via a voltage dropping desistor 64. The screen grid 42 of the sound I. F. amplifier 39 is connected by means of a resistor 80 to the sound detector screen grid 62. Each of the screen grids is provided with the usual screen bypass condenser. The manner of operation of the sound detector 60, whereby it operates as a quadrature detector to detect strong signals directly or the locked oscillator signals on weak input signals, has, as one result, the drawing of less screen current on weak signals than is drawn on strong signals. The voltage at screen grid 62 thus becomes higher in response to weak signals and lower in response to strong signals. The screen grid 42 of the sound I. F. amplifier, being connected to the screen grid 62 in accordance with the present invention, will have a similar voltage variation with input signal level. Gain of the sound I. F. amplifier thus is caused to vary inversely with input signal level, rather than directly with input signal level, as would result were the screen 42 to derive its operating potential from the B+ supply via the normal separate dropping resistor connection. It should be readily appreciated that achievement of such automatic gain control of the sound I. F. amplifier results in a significant improvement in sensitivity of the FM detector system, as well as improved limiting on strong signals. It has been demonstrated that the aforementioned "break-out sensitivity" for a given FM deviation may be improved by as much as a two-to-one factor through such use of the present invention.

In the drawing, particular values of capacitance, resistance, voltage, etc. are given for the sound channel circuits. It will be appreciated that these values, while representative of a working embodiment of the present invention, are given by way of example only.

Having thus described the invention, what is claimed is:

1. In a system for demodulating frequency modulated carrier waves, apparatus comprising the combination of a limiter amplifier for frequency modulated carrier waves, said limiter amplifier including an electron discharge device having a cathode, a control grid, a screen grid and an anode, an input circuit coupled between said control grid and cathode to which said frequency modulated carrier waves are applied, an output circuit coupled between said anode and cathode, frequency modulation detecting means coupled to said output circuit, said detecting means including a second electron discharge device operating as a quadrature grid detector for detecting directly modulated carrier waves of relatively large amplitude and for detecting locked oscillations when the modulated carrier waves are of relatively small amplitude, means for deriving from said detecting means a control voltage which varies inversely with the amplitude of said frequency modulated carrier waves, and means for applying said control voltage to said screen grid.

2. Apparatus in accordance with claim 1 wherein said second electron discharge device includes a screen electrode which draws a larger current when said modulated carrier waves are of relatively large amplitude than when said modulated carrier waves are of relatively small amplitude, and wherein said control voltage deriving means is responsive to the current drawn by said screen electrode.

3. In a television receiver, an intercarrier sound channel comprising the combination of a source of intercarrier sound intermediate frequency signals, a sound intermediate frequency limiter amplifier coupled to said source, a frequency modulation detector coupled to said sound intermediate frequency limiter amplifier, said frequency modulation detector comprising an electron discharge device operating as an oscillating detector when the output signal level of said sound intermediate frequency limiter amplifier is relatively low and operating as a non-oscillating detector when the output signal level of said sound intermediate frequency limiter amplifier is relatively high means for deriving a control voltage from said detector which increases when a change in said output signal level causes said detector to change from operation as a non-oscillating detector to operation as an oscillating detector and which decreases when a change in said output signal level causes said electron discharge device to change from operation as an oscillating detector to operation as a non-oscillating detector, and means for automatically controlling the gain of said sound intermediate frequency limiter amplifier in accordance with said control voltage.

4. In a television receiver provided with a source of sound intermediate frequency signals, the combination comprising a sound intermediate frequency limiter amplifier coupled to said source, frequency modulation detecting means coupled to said sound intermediate frequency limiter amplifier, said sound intermediate frequency limiter amplifier comprising an electron discharge device including a screen grid electrode, said detecting means comprising a second electron discharge device operating as a quadrature grid detector for detecting directly modulated carrier waves of relatively large amplitude and for detecting locked oscillations when the modulated carrier waves are of relatively small amplitude, said second electron discharge device also including a screen grid electrode, means including a resistor for connecting said sound detector screen grid electrode to a source of operating potential, and means including said resistor for connecting said sound intermediate frequency limiter amplifier screen grid electrode to said source of operating potential.

5. In a television receiver, the combination comprising an intermediate frequency signal channel common to received sound and picture signals, a video detector coupled to said intermediate frequency channel, means responsive to the output of said video detector for automatically controlling the gain of said common intermediate frequency channel in accordance with the intensity of said picture signals, means for deriving an intercarrier sound signal from said video detector output, a limiter stage comprising a first electron discharge device coupled to said deriving means, a frequency modulation detector coupled to said limiter stage and responsive to the output thereof, said frequency modulation detector comprising a second electron discharge device operating as a quadrature grid detector for detecting directly intercarrier sound signals when the intercarrier sound signal output of said limiter stage is of relatively large amplitude and for detecting oscillations locked to said intercarrier sound signals when the intercarrier sound signal output of said limiter stage is of relatively small amplitude, said first and second electron discharge devices each including a screen grid, means including a resistor for connecting the screen grid of said second electron discharge device to a source of relatively fixed operating potential, the current drawn by the screen grid of said second electron discharge device through said resistor being appreciably larger when said second electron discharge device responds to intercarrier sound signals of relatively large amplitude than when said second electron discharge device responds to intercarrier sound signals of relatively small amplitude, and means including said resistor for connecting the screen grid of said first electron discharge device to said source of operating potential.

6. In a system for demodulating frequency modulated carrier waves, apparatus comprising the combination of an amplifier for said frequency modulated carrier waves, said amplifier including an electron discharge device having a cathode, a control grid and an anode, an input circuit coupled between said control grid and cathode to which said frequency modulated carrier waves are applied, an output circuit coupled between said anode and cathode, frequency modulation detecting means coupled to said output circuit and operating as an oscillating detector with respect to frequency modulated carrier waves appearing in said output circuit at amplitude levels in a first predetermined range, said detecting means operating as a non-oscillating detector with respect to frequency modulated carrier waves appearing in said output circuit at amplitude levels in a second predetermined range higher than said first predetermined range, means for deriving from said detecting means a control voltage which is of a greater magnitude when said detecting means operates as an oscillating detector than when said detecting means operates as a non-oscillating detector, and means coupled to said amplifier for controlling the gain of said amplifier in accordance with the control voltage derived by said deriving means.

References Cited in the file of this patent

UNITED STATES PATENTS

| | | |
|---|---|---|
| 1,949,507 | Wise | Mar. 6, 1934 |
| 2,494,795 | Bradley | Jan. 17, 1950 |

Notice of Adverse Decision in Interference

In Interference No. 90,877 involving Patent No. 2,874,277, J. R. Orr, SOUND IF GAIN REGULATION, final judgment adverse to the patentee was rendered Dec. 13, 1962, as to claims 1, 2, 3, 4, 5 and 6.

[*Official Gazette May 4, 1965.*]

Disclaimer 2,874,277.—*John Richard Orr*, Merchantville, N.J. SOUND IF GAIN REGULATION. Patent dated Feb. 17, 1959. Disclaimer filed Jan. 22, 1965, by the assignee, *Radio Corporation of America*.

Hereby enters this disclaimer to claims 1 through 6 inclusive of said patent.

[*Official Gazette May 11, 1965.*]